United States Patent
Zhang et al.

(10) Patent No.: US 10,511,524 B2
(45) Date of Patent: Dec. 17, 2019

(54) CONTROLLER COMMUNICATIONS IN ACCESS NETWORKS

(71) Applicant: Futurewei Technologies, Inc., Plano, TX (US)

(72) Inventors: Jingjing Zhang, Plano, TX (US); Wei Wei, Plano, TX (US); Liurong Qian, Plano, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/724,080

(22) Filed: Oct. 3, 2017

(65) Prior Publication Data

US 2019/0104061 A1   Apr. 4, 2019

(51) Int. Cl.
| | |
|---|---|
| *H04L 12/715* | (2013.01) |
| *H04L 12/717* | (2013.01) |
| *G06F 16/22* | (2019.01) |
| *H04L 12/24* | (2006.01) |
| *H04L 12/911* | (2013.01) |
| *H04L 12/26* | (2006.01) |

(52) U.S. Cl.
CPC .......... *H04L 45/64* (2013.01); *G06F 16/2246* (2019.01); *H04L 41/044* (2013.01); *H04L 41/0806* (2013.01); *H04L 45/42* (2013.01); *H04L 41/0654* (2013.01); *H04L 41/0823* (2013.01); *H04L 41/12* (2013.01); *H04L 41/14* (2013.01); *H04L 43/0817* (2013.01); *H04L 47/783* (2013.01)

(58) Field of Classification Search
None
See application file for complete search history.

(56) References Cited

U.S. PATENT DOCUMENTS

| | | | |
|---|---|---|---|
| 6,584,499 B1* | 6/2003 | Jantz | H04L 29/06 709/220 |
| 6,614,764 B1 | 9/2003 | Rodeheffer et al. | |
| 6,760,324 B1* | 7/2004 | Scott | H04L 45/02 370/352 |
| 2002/0101875 A1 | 8/2002 | Lui et al. | |
| 2003/0140165 A1 | 7/2003 | Chiu et al. | |
| 2003/0193959 A1 | 10/2003 | Lui et al. | |

(Continued)

FOREIGN PATENT DOCUMENTS

CN          104142896 A       11/2014

OTHER PUBLICATIONS

International Search Report dated Jan. 7, 2019 in PCT Application No. PCT/CN2018/107566, 13 pages.

(Continued)

*Primary Examiner* — Eunsook Choi
(74) *Attorney, Agent, or Firm* — Vierra Magen Marcus LLP

(57) ABSTRACT

Control plane management based on the physical topology of nodes in software-defined networks (SDNs) is provided. A tree structure in an SDN such as an access network is identified. Control plan management is provided using the tree structure. A controller configures changes in the SDN and provides notifications to other controllers after configuring devices under its control. A controller prioritizes the status of downstream and/or upstream devices based on a type or direction of data flow when making configuration decisions. A controller provides notifications to other controllers by prioritizing notifications based on the hierarchical position of devices.

8 Claims, 14 Drawing Sheets

(56) References Cited

U.S. PATENT DOCUMENTS

| | | | |
|---|---|---|---|
| 2015/0103844 A1* | 4/2015 | Zhao | H04L 45/42 |
| | | | 370/410 |
| 2015/0236948 A1 | 8/2015 | Dunbar et al. | |
| 2016/0080966 A1 | 3/2016 | Kalkunte | |
| 2016/0135111 A1* | 5/2016 | Huang | H04W 28/16 |
| | | | 370/254 |
| 2016/0277959 A1* | 9/2016 | Venkataraman | H04L 45/125 |
| 2016/0380807 A1* | 12/2016 | Shevenell | H04L 41/082 |
| | | | 370/252 |
| 2017/0289020 A1* | 10/2017 | Zhao | H04L 45/04 |
| 2018/0167307 A1* | 6/2018 | Barry | H04L 43/0817 |
| 2018/0324093 A1* | 11/2018 | Namjoshi | H04L 45/70 |

OTHER PUBLICATIONS

Zhang, et al, "Modeling Access Networks as Trees in Software-Defined Network Controllers", filed on Oct. 3, 2017, U.S. Appl. No. 15/725,035, 48 Pages.

Zhang, et al, "Topology-Aware Controller Associations in Software-Defined Networks", filed on Sep. 22, 2017, U.S. Appl. No. 15/712,886, 47 Pages.

Berde et al., ONOS: Towards and Open, Distributed SDN OS, HotSDN'14, Aug. 22, 2014, 6 Pages.

Hock et al., Pareto-Optimal Resilient Controller Placement in SDN-based Core Networks, 25th International Teletraffic Congress (ITC), 2013, 9 Pages.

Muller et al., Survivor: an Enhanced Controller Placement Strategy for Improving SDN Survivability, Globecom, 2014, 7 Pages.

Panda et al., SCL: Simplifying Distributed SDN Control Planes, 14th USENIX Symposium on Networked Systems Design and Implementation (NSDI' 17), Mar. 27-29, 2017, 19 Pages.

Office Action dated Mar. 8, 2019, in U.S. Appl. No. 15/725,035.

\* cited by examiner

CONTROLLER COMMUNICATIONS IN ACCESS NETWORKS

FIELD OF THE INVENTION

The present technology generally relates to the field of computer networks, and in particular to a controller and access network device communication in software-defined computer networks.

BACKGROUND

A distributed system is a collection of two or more autonomous computers linked by a computer network where components, such as memory and processing units, located on these networked computers communicate and coordinate their actions to achieve a common goal. These components may communicate and coordinate with each other by passing messages. Examples of distributed systems are wide ranging. They include service-oriented architecture (SOA) based systems, massively multiplayer online games, peer-to-peer applications, shared memory systems, and shared data stores, such as file systems, databases, optimistic replication systems, and web caching.

Operating a distributed system may involve many interacting components located at different places in the network. It is important to manage the consistency across all of these components, including consistency in the information stored and the operations performed by these components, to ensure that the distributed system behaves as intended according to how the system was designed. To this end, a consistency model may be established. A consistency model is a set of rules for managing consistency in a distributed system. These rules constrain how a distributed system operates to ensure that the system behaves predictably.

SUMMARY

According to one aspect of the present disclosure, there is provided a device, comprising: a non-transitory memory storage comprising instructions; and one or more processors in communication with the memory, wherein the one or more processors execute the instructions to: receive, at a controller that is coupled to a server at a root node of a software-defined access network having two or more network-connected devices arranged in a hierarchical tree structure, a signal from a network-connected device; determine, based on the received signal, one or more instructions to be transmitted to one or more controlled devices positioned in a downstream node relative to the root node; transmit the one or more instructions to the one or more controlled devices; and notify one or more other controllers in the access network of one or more changes to the one or more controlled devices after transmitting the one or more instructions.

Optionally, in any of the preceding aspects, the controller is a first controller and the root node is a first root node; and the one or more other controllers includes a second controller that is coupled to a second root node of the software-defined access network.

Optionally, in any of the preceding aspects, determining the one or more instructions includes identifying the one or more controlled devices in response to the signal and determining configuration information for the one or more controlled devices; and transmitting the one or more instructions includes transmitting the configuration information to the one or more controlled devices.

Optionally, in any of the preceding aspects, the one or more processors execute the instructions to: configure the one or more controlled devices based on the configuration information.

Optionally, in any of the preceding aspects, the one or more processors execute the instructions to: configure the one or more controlled devices without achieving agreement with the one or more other controllers.

Optionally, in any of the preceding aspects, each of the two or more network-connected devices includes at least one of a controller, a switch, or a user device.

Optionally, in any of the preceding aspects, the signal comprises a status update.

Optionally, in any of the preceding aspects, the signal comprises a data routing request.

Optionally, in any of the preceding aspects, the one or more instructions comprise instructions for routing data through the access network.

Optionally, in any of the preceding aspects, the one or more changes in the one or more controlled devices comprise one or more updates to a log of all events occurring at each of the one or more controlled devices.

According to one aspect of the present disclosure, there is provided a computer-implemented method for managing network consistency, comprising: receiving, at a controller for a software-defined network having a hierarchical structure, one or more signals associated with a first status of a first network device at a first node and a second status associated with a second network device at a second node; determining that a first hierarchical position of the first network device is higher than a second hierarchical position of the second network device; configuring one or more network operations for the software-defined network based on prioritizing the first status of the first network device over the second status of the second network device; and performing the one or more network operations.

Optionally, in any of the preceding aspects, the first and second network-devices comprise network switches.

Optionally, in any of the preceding aspects, the first and second network devices comprise user devices.

Optionally, in any of the preceding aspects, the second network device is at a hierarchically lower level in the tree structure of the access network relative to the first network device.

Optionally, in any of the preceding aspects, the one or more signals comprise status updates.

Optionally, in any of the preceding aspects, the one or more signals comprise data routing requests.

Optionally, in any of the preceding aspects, the one or more network operations comprise sending instructions to one or more network devices for routing data through the access network.

Optionally, in any of the preceding aspects, the one or more network operations comprise configuring one or more network devices controlled by the controller.

According to one aspect of the present disclosure, there is provided a non-transitory computer-readable medium storing computer instructions for managing network consistency, that when executed by one or more processors, cause the one or more processors to perform the steps of: receive, at a controller for a software-defined access network, one or more signals identifying a first status of a first network-connected device and a second status of a second network-connected device; determine that the second network-connected device has a position downstream to the first network-connected device; based on the position of the second network-connected device, transmit a first status notification to one or more other controllers in the access network identifying the first status of the first network-connected device prior to transmitting a second notification to the one or more other controllers identifying the second status of the second network-connected device.

Optionally, in any of the preceding aspects, receiving one or more signals comprises receiving a first signal associated with the first status and a second signal associated with the second status; and the second signal is received prior to the first signal.

Optionally, in any of the preceding aspects, each of the first and second network-connected devices includes at least one of a controller, a switch, or a user device.

Optionally, in any of the preceding aspects, the one or more signals comprises status updates.

Optionally, in any of the preceding aspects, the one or more signals comprises data routing requests.

According to one aspect of the present disclosure, there is provided a non-transitory memory storage comprising instructions; and one or more processors in communication with the memory, wherein the one or more processors execute the instructions to: receive, at a controller, a request for a data transfer from an originating network device to a target network device; determine, based on the received request, whether the data transfer involves upstream or downstream communication; assign network bandwidth to one or more network devices based on prioritizing a status of upstream network devices in response to a determination that the data transfer involves upstream communication; and assign network bandwidth to one or more network devices based on prioritizing a status of downstream network devices in response to a determination that the data transfer involves downstream communication.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
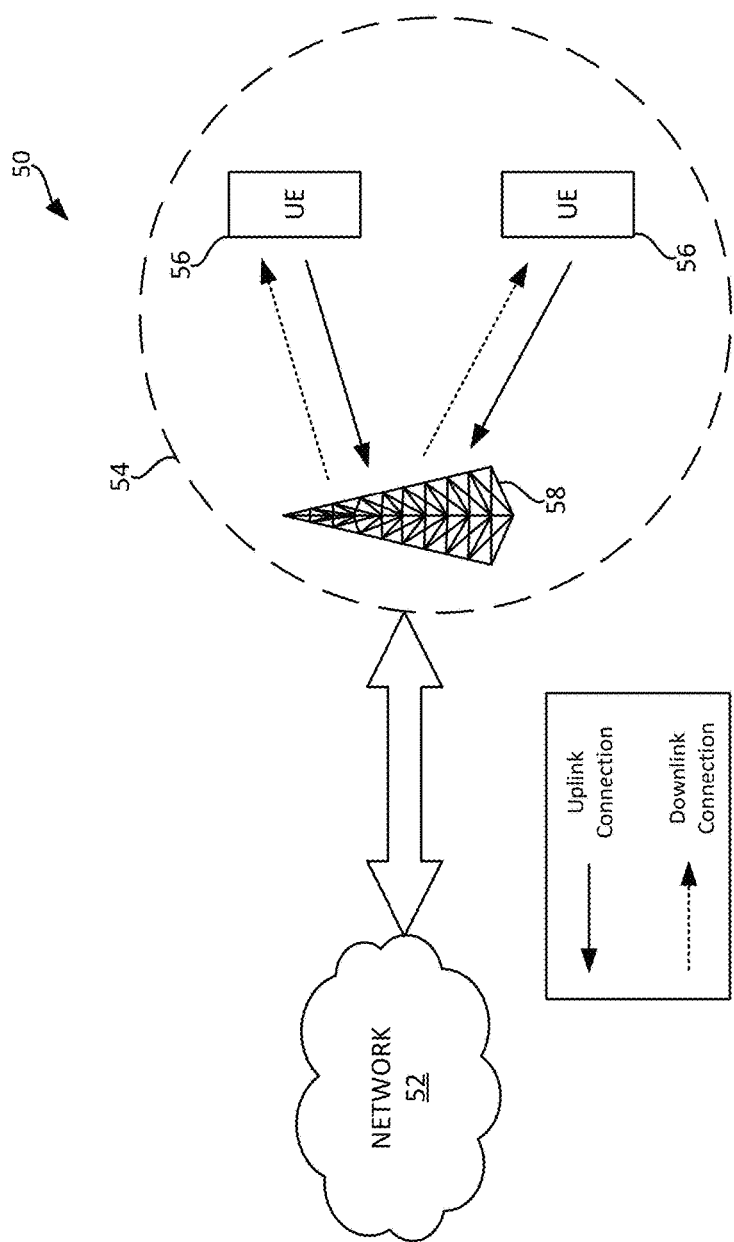
FIG. 1 illustrates a network environment for communicating data.

The disclosed technology is directed to controller and access network device communication in software-defined networks. For example, a software-defined access network may provide connectivity between a plurality of user equipment (e.g., client devices) and one or more other networks such as a subscriber network or the Internet. An access network typically includes a plurality of network nodes with connecting links between less than all of the nodes.

In one embodiment, a controller may make decisions and configure network devices, followed by notifying other controllers of the changes. Controllers can directly control and configure network devices and notify other controllers of changes made afterwards. In one example, this leverages the unique feature of access distribution trees that do not require consistency management prior to performing network operations. The present technology may enable controllers to respond more quickly to network events without having to achieve consistency with other controllers.

By sending notifications to other controllers after controlling and configuring network devices, consistency across multiple controllers in the access network can be maintained. This allows backup controllers to maintain updated information on the current status of network devices within the access distribution tree of the primary controller so that backup controllers can quickly take over if the primary controller fails.

In one embodiment, this approach is provided for primary controllers of access distribution trees. The primary controller controls an independent section of the access network. It may not need to coordinate with other controllers in order to perform routine network operations such as routing data transfers and configuring network devices. Consequently, primary controllers may not need to achieve consistency with other controllers prior to controlling and configuring network devices, as may be the case with some conventional approaches.

According to one embodiment, a controller makes decisions based on prioritizing the status (e.g., online or offline) of upstream devices over the status of downstream devices. Controller decisions may include decisions on how to route data from an originating device to a target destination at another network device or decisions on how to configure network devices. In one embodiment, access networks are arranged according to a hierarchical tree structure. A single physical communicative connection may be provided between each pair of devices that are directly upstream and downstream to each other.

In one embodiment, information, including control plane signals, from downstream devices may pass through upstream devices. Upstream devices may occupy a more central location in the tree structured access network. The status of upstream devices may be more determinative of whether data from any given network device, including data from downstream devices, can be successfully transferred up the access network to reach a root node. For example, given an upstream device A and a downstream device B, if A is offline, then data from B cannot be transferred up to the root node regardless of whether B is online or offline. When A is online, B's status become relevant in determining whether routing data from B to a root node can be successfully achieved. Thus, the status of upstream devices may be prioritized in the determination of data pathing decisions in the context of data transfers in an access network According to one embodiment, a controller reports the status of upstream devices before reporting the status of downstream devices. Given the hierarchical tree structure of access networks, upstream devices are positioned at more central nodes in the access network and are more topologically connected to other nodes in the network relative to downstream devices. Because of the greater connectivity of upstream devices, they are more likely to play a role in facilitating data transfers. In addition, the status of upstream devices ultimately determines whether data, such as control and data plane signals, from downstream devices can reach more upstream devices. Data from downstream devices passes through upstream devices in order to reach network devices and controllers that are further upstream. Consequently, one embodiment notifies controllers of the status of upstream devices prior to the status of downstream devices.

When a primary controller fails, backup controllers take over. During such an event, a backup controller may make decisions based on its understanding of the status of the access distribution tree of the failed primary controller. If the backup controller has the most updated information on the status of upstream devices, it can make better data pathing decisions, since those data paths are more likely to pass through upstream devices rather than downstream devices. By prioritizing upstream devices when sending notifications to other controllers, it may be more likely for a backup controller to smoothly and successfully take over in the event of a primary controller failure.

In one embodiment, an access distribution tree in the access network may comprise more than one controller, including a primary controller and one or more secondary controllers. The controllers may coordinate with each other in performing network operations. In one embodiment, upstream devices are prioritized when making controller decisions and when sending notifications about the status of network devices to other controllers. This can minimize the effects of delays between controlling and configuring network devices and sending notifications to other controllers, should such delays occur.

According to one embodiment, a technique is provided that avoids seeking consensus across multiple controllers or polling devices when making and executing controller decisions. By directly acting on network devices, controllers can respond faster to network events. By notifying other controllers of network changes and by prioritizing upstream devices, sacrifices to consistency across multiple controllers can be minimized. Lower network latency, higher network availability, and an overall improved user experience may be provided. The communication schemes described above may be applied together in combination or separately and independently in alternative embodiments.

A distributed system is built upon a computer network, also called a data network. A data network is a collection of interconnected network devices, such as routers, switches, bridges, wireless transceivers, desktop computers, smartphones, and other devices that transport data through the data network. Each network device may be a node in the data network that may be communicatively connected to one or more other nodes in the data network. Each node is associated with at least one device. In contrast to a generic data network, a distributed system is a type of data network that has the additional functionality of coordinating multiple network devices to achieve a common goal, such as transferring data from an originating network device to a target destination in the data network.

FIG. 1 illustrates an example of a network environment 50 for communicating data. Network 50 includes a base station 58 including one or more antennas having a coverage area 54. Base station (BS) 58 may include a communications controller. Network environment 50 includes a plurality of user equipment (UEs) 56, and a network 52 such as a backhaul network. Two UEs are depicted, but many more may be present. A communications controller at base station 58 may be any component capable of providing wireless access by, inter alia, establishing uplink (dashed line) and/or downlink (dotted line) connections with UEs 56. Base station 58 may include an enhanced base station (eNB), a picocell, a femtocell, and other wirelessly enabled devices. UEs 56 may be any component capable of establishing a wireless connection with BS 58, such as cell phones, smart phones, tablets, sensors, etc. Network 52 may be any component or collection of components that allow data to be exchanged between BS 58 and a remote end (not shown). In some embodiments, the network 52 may comprise various other wireless devices, such as relays, femtocells, etc.

In one embodiment, a distributed system may be implemented as one or more software-defined networks (SDN). SDN is an approach to computer networking that creates an abstraction of the computer network's lower-level functions and provides an interface for controlling and managing the computer network's behavior. Specifically, an SDN simplifies modern networks by decoupling the network's data-forwarding functions (i.e. data plane) from its management functions (i.e. control plane), such as data routing and resource allocation functionalities previously performed by devices at the network nodes. In other words, a control plane and a data plane are abstractions of control and data-forwarding functions, respectively, and are handled differently by the SDN, even though they may be implemented on the same physical network infrastructure in embodiments of the present technology. In alternative embodiments, there may be a separate physical network infrastructure for implementing control plane functions.

Signals are sent along the control and data planes in the form of control plane packets and data plane packets. While control plane packets and data plane packets may be sent along the same physical network infrastructure, they may be differentiated and handled differently by the SDN. For example, the SDN may prioritize sending control plane data packets over data plane data packets, particularly when network traffic is congested or network bandwidth is low.

Network devices at network nodes that support software-defined networking may be configured to implement data plane functions, while control plane functions may be provided by an SDN controller. A controller is a device that controls and configures network devices in order to facilitate the transfer of data from an originating network device to an intended destination in a network. A controller does this by receiving information from network devices and sending out instructions to network devices based on the information it receives via the control layer of the SDN. A controller may be implemented as a software application or a hardware component. A controller may be implemented as part of a network device at a node within the SDN, or as part of a central server of the SDN. Alternatively, a controller may also be implemented as a standalone device that is connected to the SDN. Controllers may be abstracted and treated as independent entities separate from the network nodes of the data plane by the SDN.

Figure 2:
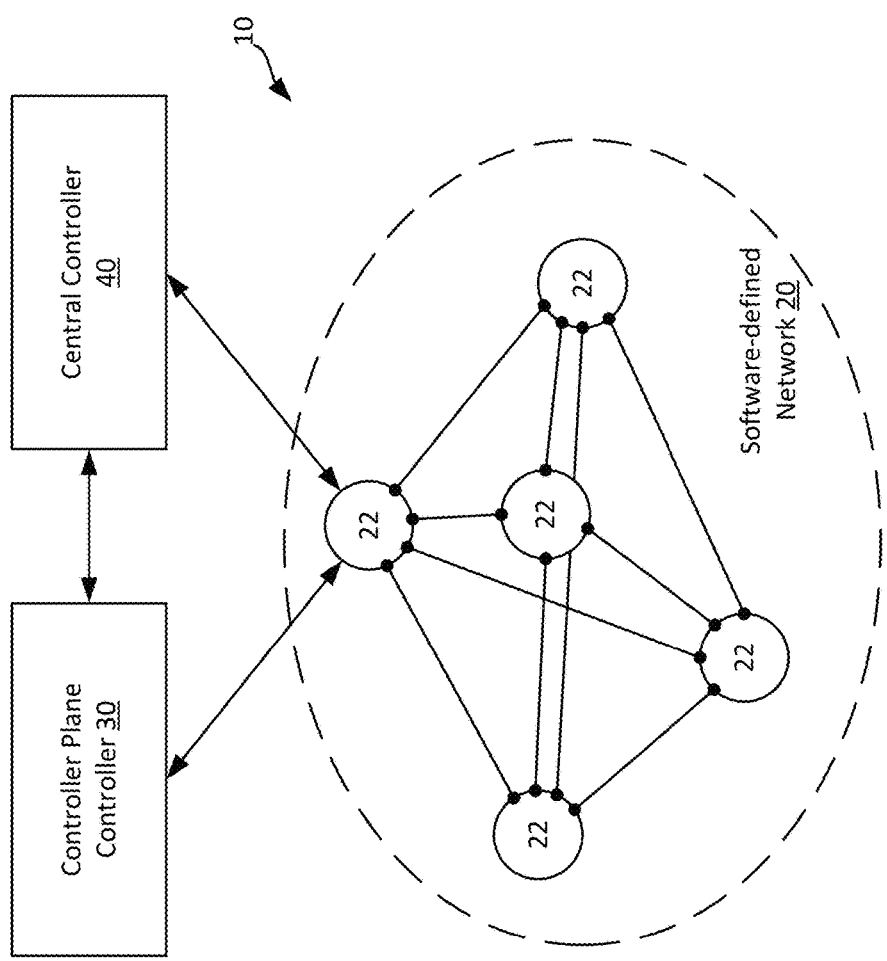
FIG. 2 is a block diagram of an example of a network environment.

FIG. 2 is a block diagram of an example of a network environment 100 in which embodiments of the disclosed technology may be practiced. The network environment comprises a software-defined network (SDN) 20, at least one control plane controller 30, and at least one central controller 40. The SDN 20, the control plane controller 30, and the central controller 40 communicate with each other via optical, electrical, or wireless means. Although controller 30 is shown separate from SDN 20, controller 30 may be implemented in the SDN 20 at one of nodes 22, for example. Controller 30 may be implemented in a server or other computing device at one of nodes 22, or a computing device remote from SDN 20.

In one embodiment, SDN 20 can be implemented as an access network that provides connectivity between user equipment 56 and network 52. For example, SDN 20 may include a plurality of network nodes that provide multiple configurable data paths to provide connections between user equipment 56 and network 52.

In one embodiment, the SDN 20 is a packet switched network, where data traffic is transported using packets or frames along network paths or routes. The packets may be routed or switched along a traffic engineered label switched paths established by a signaling protocol, such as multiprotocol switching (MPLS) or Generalized MPLS (GMPLS), based on a path computed by the controller 30 and/or developed by the nodes 22. The SDN 20 comprises a plurality of nodes 22 coupled to one another using optical, electrical, or wireless links. The SDN 110 may also comprise a plurality of domains, such as autonomous system (AS) domains or IGP areas, which may each comprise a set of network elements corresponding to the same address management and/or path computational responsibility. The domains are organized via physical mechanisms (e.g. location, connections, etc.) and/or logical means mechanisms (e.g. network topology, protocols, communication layers, etc.). The different domains are coupled to each other and each comprises some of the nodes 22.

Nodes 22 are any devices or components that support transportation of the packets through the SDN 20. For example, the nodes 22 may include bridges, switches, routers, or various combinations of such devices. The nodes 22 may include a plurality of ingress ports for receiving packets from other nodes 22, logic circuitry that determines which nodes 22 to send the frames to, and a plurality of egress ports for transmitting frames to the other nodes 22. In some embodiments, at least some of the nodes 22 are label switched routers (LSRs), which are configured to modify or update the labels of the packets transported in the label switched network 20. In some embodiments, some of the nodes 22 are label edge routers (LERs). For example, the nodes 22 at the edges of the SDN 20 are configured to insert or remove the labels of the packets transported between the label switched network 110 and external networks. The first node 22 and the last node 22 along a path are sometimes referred to as the source node or head end node and the destination node or tail end node, respectively. Although four nodes 22 are shown in the SDN 20, the SDN 20 may comprise any quantity of nodes 22. Additionally, the nodes 22 may be located in different domains in the SDN 20 and may be configured to communicate across multiple domains. For example, the nodes 22 that correspond to different domains may exchange packets along a path that is established across multiple domains.

The control plane controller 30 is any device configured to coordinate activities within the SDN 20. Controller 30 may include a Network Management System (NMS) or Operations Support System (OSS). Specifically, the control plane controller 30 receives routing requests from the SDN 30 and returns the corresponding path information. The control plane controller 30 may perform path computation and forward the computed path to at least one of the nodes 22. The control plane controller 30 may be located in a component outside of the SDN 30, such as an external server, or may be located in a component within the SDN 110, such as in a server at a node 22.

The central controller 40 is any device configured to coordinate activities by the control plane controllers 30, for example where multiple control plane controllers are used to manage control plane functions within the SDN 20. The central controller 40 may be located in a component outside of the SDN 20, such as an external server, or may be located in a component within the SDN 20, such as in a server at a node 22. In one embodiment, a central controller performs the processes described herein to generate a network configuration. The network configuration can be provided to one or more control plane controllers 30.

A controller may be operated based on the OpenFlow protocol. An SDN is a network technology that provides programmable central control of network traffic without requiring physical access to the network's devices. SDNs may employ Internet Protocol (IP) networks utilizing Transmission Control Protocol/Internet Protocol (TCP/IP). SDNs may decouple the data-forwarding capability, e.g., the data plane, from routing, resource, and other management functionality, e.g., the control plane, previously performed in the network nodes. Decoupling the control plane from the data plane of the network enables the network controller to efficiently control the network traffic through globally optimized traffic engineering and routing, which departs from locally optimized shortest path first. SDN may also simplify network operations or even have the capabilities to flatten the network with extended data routing vectors.

A controller may be designed that controls and manages an entire network such as an access network (e.g., including GPON—gigabit passive optical network, EPON—Ethernet passive optical network, G.Fas.). Examples of SDN controllers include ONOS (open network operating system) and ODL (Open Daylight). Controllers may utilize protocols including netconf, openflow, or private vendor protocols. In some exmaples, a hardware abstraction layer is provided between provide vendor devices and the SDN controller. Voltha is an example of a hardware abstraction layer that can be provided. In some examples, openflow and/or Netconf protocols may be used to communicate between a VOLTHA hardware abstraction layer and an ONOS or ODL controller.

The control plane controller may include or communicate with a path computation engine (PCE), not shown. A PCE is any device or component configured to perform all or part of the path computation for the SDN 20, e.g. based on a path computation request. The PCE can receive information for computing a path from the control plane controller 30, from the node 22, or both. The PCE processes the information to obtain the path. For instance, the PCE computes the path and determines the nodes 22 including the LSRs along the path. The PCE may then send all or part of the computed path information to the control plane controller 30 or directly to at least one node 112. Further, the PCE 130 is typically coupled to or comprises a traffic-engineering database (TED), a P2MP Path database (PDB), a P2P path database, an optical performance monitor (OPM), a physical layer constraint (PLC) information database, or combinations thereof, which may be used to compute the path. The PCE may be located in a component outside of the SDN 20, such as an external server, or may be located in a component within the SDN 20, such as at node 22. The PCE may be configured as part of the control plane controller 30. Alternately, the PCE may be configured as part of the central controller 40.

A path computation request is sent to the PCE by a requesting device. The requesting device is any client application requesting a path computation to be performed by the PCE. The requesting device may also be any network component that makes such a request, such as the control plane controller 30, or any node 22, such as a LSR. For instance, the requesting device may request from the PCE a P2MP path or P2P path in a single domain or across multiple domains in SDN 20. Additionally, the requesting device may send the PCE at least some of the path required information, for example via a path computation request and/or through broadcast signaling via link state advertisements (LSAs), etc.

In one embodiment, a central server of the SDN may access network information that describes the SDN. The network information may be accessed by receiving network information from network devices at nodes in the SDN, by polling the network devices in the SDN, or by reading preexisting network information stored at the central server. Network information may include traffic information related to the nodes of the network, physical topology information, and/or other information relating to nodes in the SDN.

Figure 3:
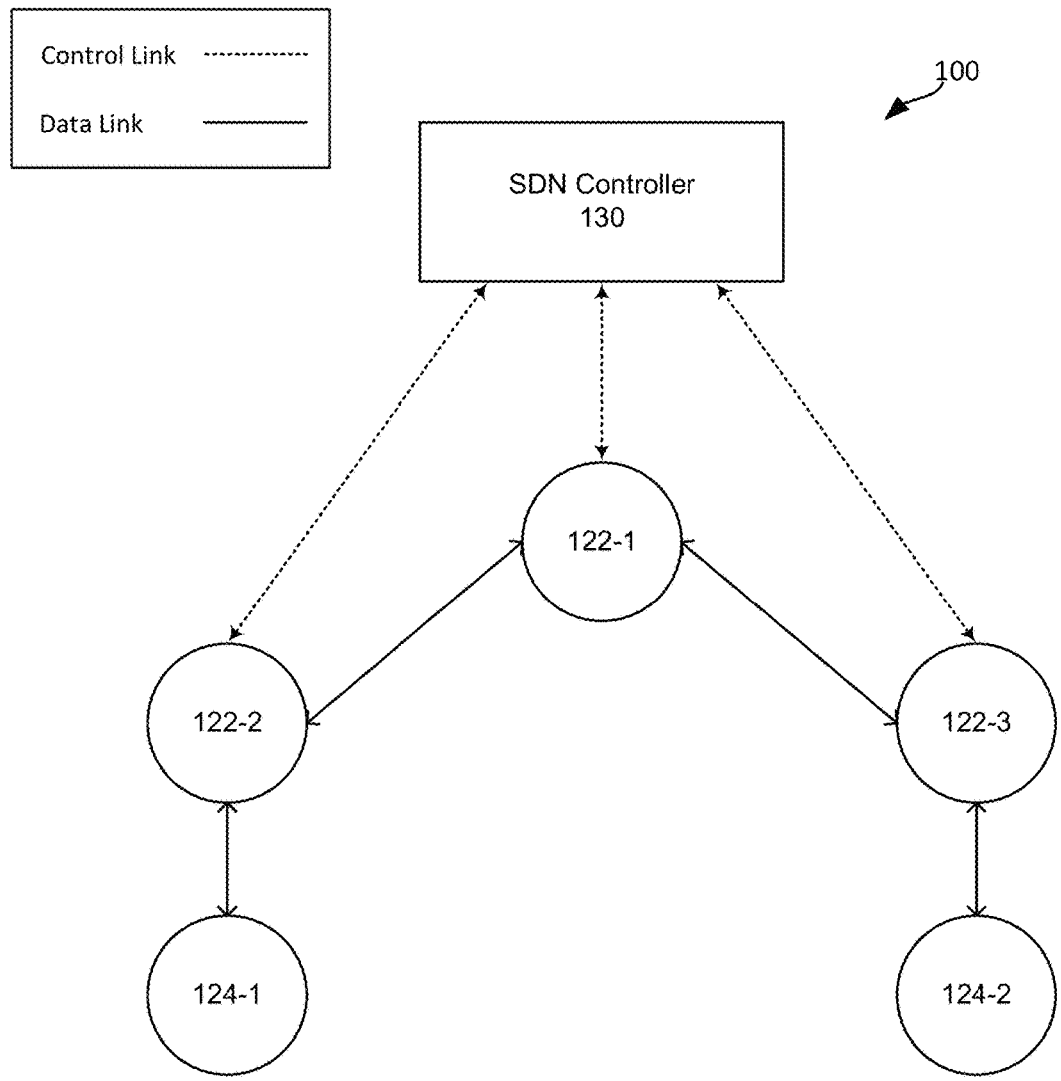
FIG. 3 is a schematic diagram of an example embodiment of a software-defined network (SDN) network.

FIG. 3 is a schematic diagram of an example embodiment of an SDN network 100. The network 100 comprises an SDN controller 130, a plurality of network nodes 122, and a plurality of end nodes 124. The network nodes 122 comprise switches, routers, bridges, and/or any other device that is used to receive and/or forward data in a network. The control path is represented by dashed lines and the data path is represented by solid lines. System configuration, management information, and routing/forwarding table information are exchanged between the network controller 130 and the network nodes 122 via the control path.

Data packets are received from end nodes 124 and forwarded between network nodes 122 via the data path. For example, data from end node 124-1 acting as a publisher are received at network node 122-2 acting as an Ingress Border Router (IBR), routed through network node 122-1 acting as a Transit Router (TR), and passed to end node 124-2 acting as a destination node using network node 122-3 acting as an Egress Border Router (EBR). A border router is a router on the edge of an SDN domain that is connected to at least one node outside of the SDN domain, the IBR is an SDN border router that receives traffic from outside of the SDN domain, and the EBR is an SDN border router that sends traffic outside of the SDN domain. The TR is an SDN router that transports traffic within the SDN domain and has no interfaces connected outside of the SDN domain. A single border router may function as an IBR, an EBR, or both, depending on traffic flow(s) transported through the LSPs. The end nodes 124 are any network elements configured to transmit, receive, originate, and/or terminate data, or, in alternate embodiments, other networks, e.g., IP networks, MPLS networks, etc. In some embodiments, the network controller 130 is a generalized network controller configured to control the network nodes 122 and end nodes 124. The network controller 130 is any device configured to perform control path and/or control plane functionality, such as creating a network map and defining the information in a routing table that defines how to route incoming packets. The network controller 130 is also configured for management and control functionality of the control plane, which includes routing and resource management. The network nodes 122 and end nodes 124 include devices that receive and transmit data through the network 200 according to a standard. At least some of the network nodes 122 and end nodes 124 and network controller 130 may conform to a standard, e.g. as defined by Open Networking Foundation (ONF) document OpenFlow Switch Specification version 1.3.4, ONF document OpenFlow Controller Switch NDM Synchronization version 1.0, and ONF document Software-Defined Networking: The New Norm for Networks, ONF Whitepaper (collectively OpenFlow).

Though not shown within FIG. 3, the controller 130 receives data from, and transmits messages to, the network nodes, which data and messages may be used to manage and control the network nodes (e.g., the controller can determine the network topology based on data received from the network nodes). Some of the incoming messages or parts of the incoming messages are translated into a standard independent format for processing by some of the modules in the network controller 130. The standard independent format is based on an abstract network control data model that provides an abstraction of the attributes or features of the various standard formats. The network controller 130 interacts with the network nodes via a variety of application programming interface (API) protocols, e.g., OpenFlow. The controller determines the global network topology of the network. With the global network topology, state information, dynamic traffic flow/volume information, and other network state information, the network controller makes decisions on how to assign resources and route applications, information, and/or data packet flows through the network.

Figure 4:
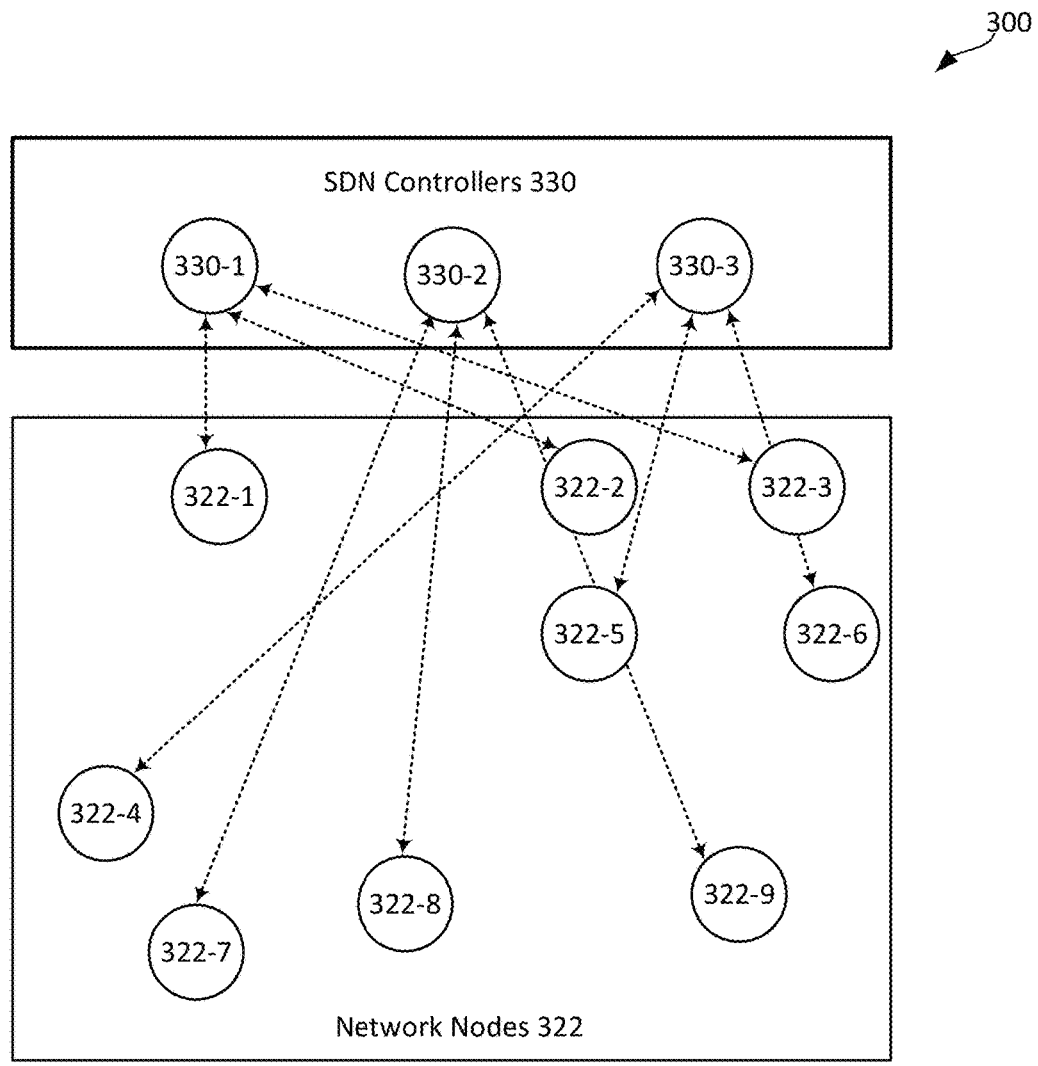
FIG. 4 is a block diagram of an example of a network environment including multiple controllers.
Figure 5:
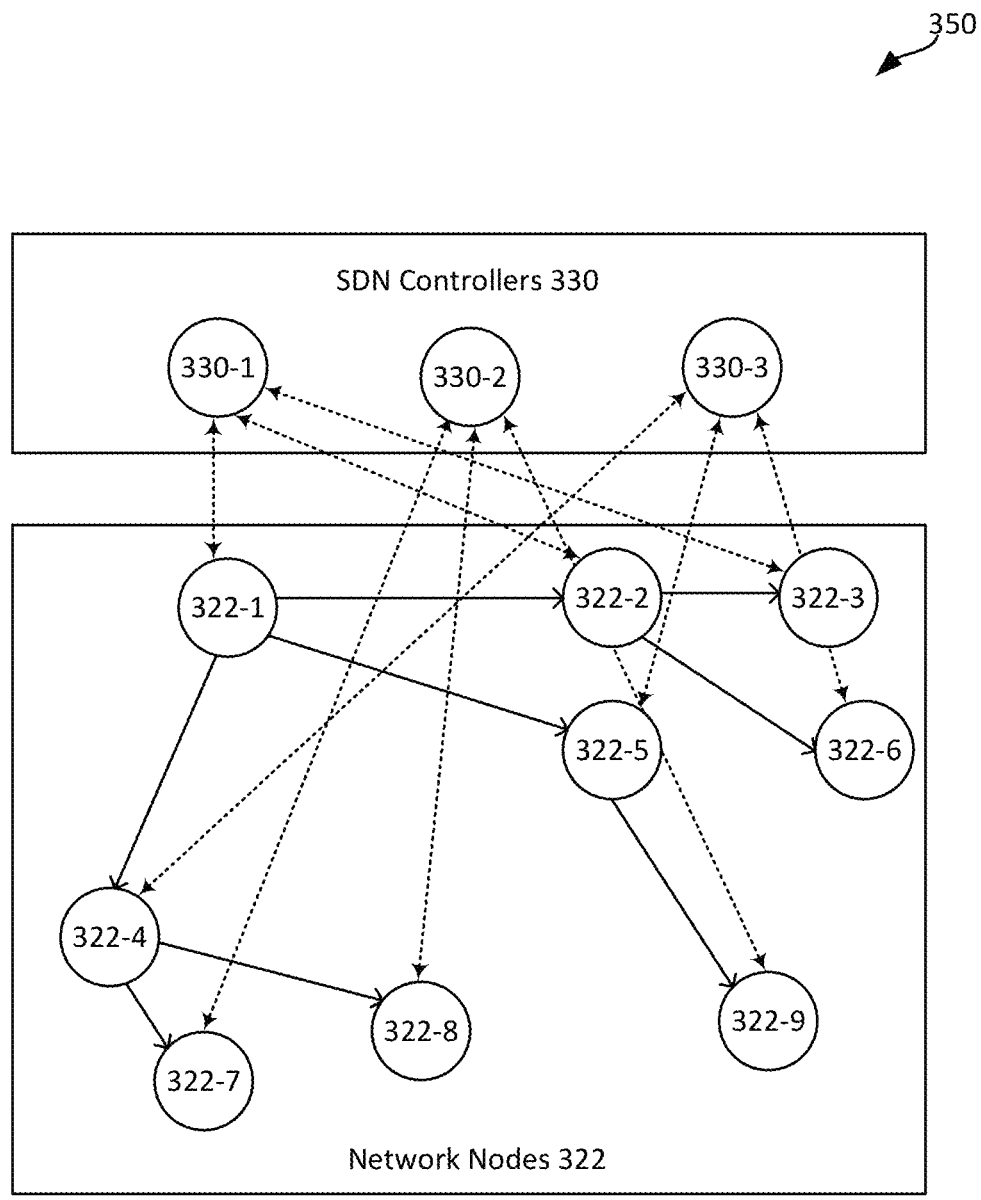
FIG. 5 is a block diagram of an example of a network environment including nodes in a tree topology.

FIG. 4 is a block diagram of another example of a network environment 300 including multiple SDN controllers 330 for managing and controlling a plurality of network nodes 322. Multiple controllers may be used in implementations with a large number of network nodes to be managed, as well as to provide high availability. In FIG. 5, controller 330-1 includes control links with nodes 322-1, 322-2, and 322-3. Controller 330-2 includes control links with nodes 322-7, 322-8, and 322-9. Controller 330-3 includes control links with nodes 322-4, 322-5, and 322-6.

In this manner, the nodes are divided into three node partitions, also referred to as node clusters, with each partition including three network nodes. Similarly, the three controllers may be said to form a controller cluster for all of the network nodes. The use of multiple controllers may provide high availability by providing the capability of one controller to take over for another in the event of failure. Nodes 322-1, 322-3, and 322-3 form a node cluster controlled by controller 330-1. Nodes 322-7, 322-8, and 322-9 form a node cluster controller by controller 330-2, and nodes 322-4, 322-5, and 322-6 form a node cluster controller by controller 330-3.

In one embodiment, a node or device at a node only communicates with a single primary controller. The node may have connections to other controllers, but only communicates with the primary controller at a given point in time. If however, the primary controller for the node fails, another controller connected to the node may take over control plane functions for the nodes controlled by the failed controller. For example, in response to an event indicating that controller 330-1 has failed, control of nodes 322-1, 322-2, and 322-3 may shift to controller 330-2.

In one embodiment, an SDN having a plurality of nodes may be configured for control by multiple controllers. Open application programming interface (API) services, such as the OpenFlow protocol, may manage the interactions between the data plane and control plane and allow for the implementation of non-vendor specific combinations of networking nodes and SDN controllers within a network. As a result, software-defined networking in conjunction with an Open API service may provide numerous benefits to modern networks that include increased network virtualization, flexible control and utilization of the network, and customization of networks with specific requirements.

FIG. 5 is a block diagram of a network environment 350, continuing with the example network nodes 322 shown in FIG. 4. In FIG. 5, the physical topology including connecting links between the intermediate nodes of the access network is shown. An examination of the node and link structure reveals a common attribute of access networks, namely a tree topology having at least one root node through which data for one or more downstream nodes passes.

In FIG. 5, node 322-1 is a root node for each of the other nodes. A tree topology is formed with root node 322-1 and the downstream nodes. FIG. 5 has five individual connecting paths originating at root node 322-1. A first branch of the tree includes root node 322-1 and downstream nodes 322-2 and 322-3. A second branch of the tree includes root node 322-1 and downstream nodes 322-2 and 322-6. A third branch of the tree includes root node 322-1 and downstream nodes 322-5 and 322-9. A fourth branch of the tree includes root node 322-1 and downstream nodes 322-4 and 322-7. A fifth branch of the tree includes root node 322-1 and downstream nodes 322-4 and 322-8.

In a tree topology as illustrated, the full set of nodes is not interconnected as in many architectures, such as the mesh architecture shown in FIG. 1. The branches do not have connecting edges and thus, do not communicate directly. Instead, the braches communicate through one or more intermediate connecting nodes. For example, the leaf nodes in each branch have no direct connecting links. Accordingly, communication between the nodes must pass through at least one upstream node to reach another leaf node. For example, communication from node 322-3 must pass through nodes 322-3, 322-1, and 322-5 to reach node 322-6.

Traditionally, network configurations have not considered the tree topology of a network in making controller assignments for nodes in an SDN. Moreover, the traffic implications of different controller assignments have not been considered. As a consequence, optimization of uptime in SDNs has not been achieved.

Figure 6:
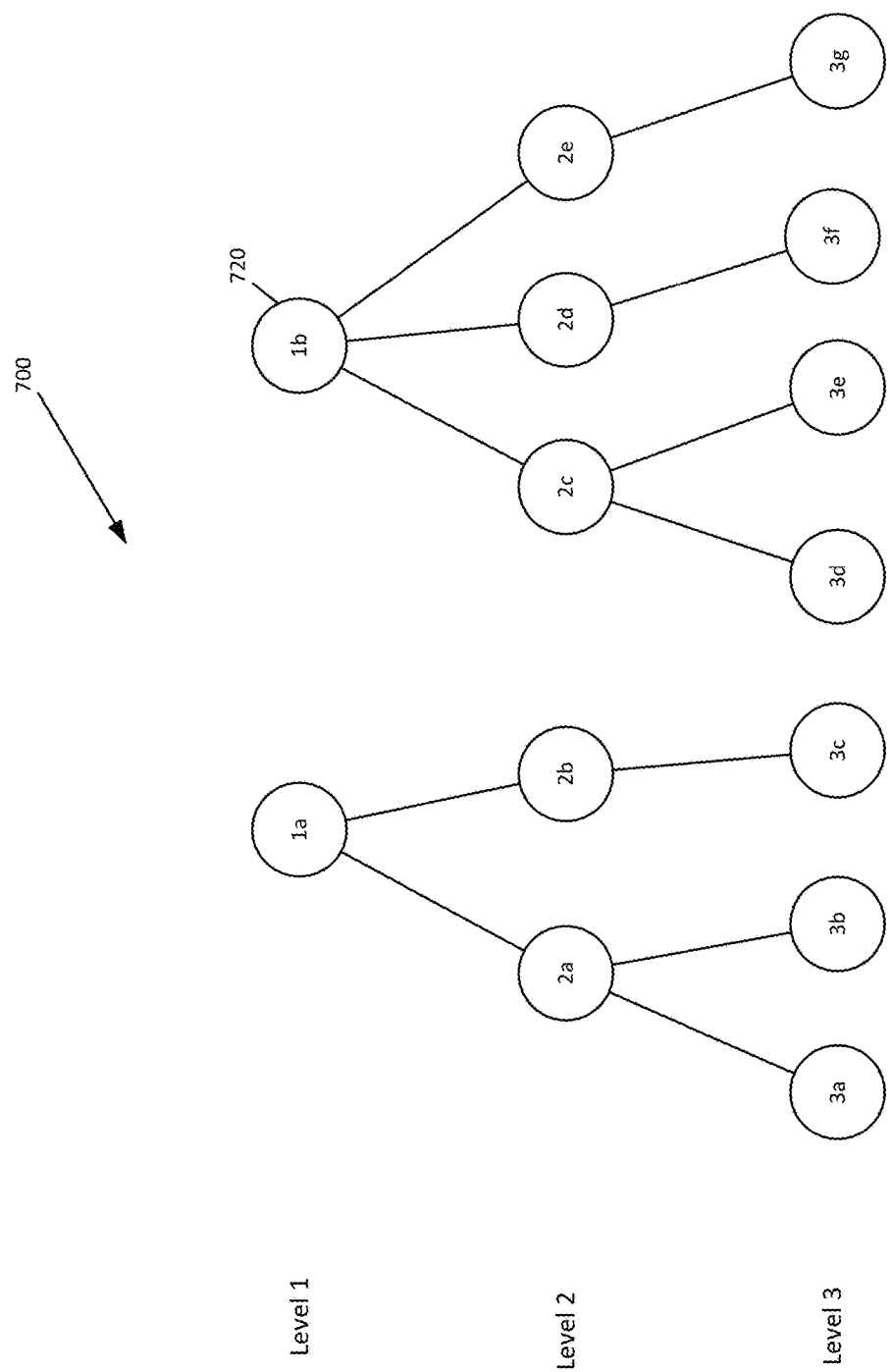
FIG. 6 is a high-level block diagram of an exemplary access network according to an embodiment of the present technology.

Consider the controller assignments in FIG. 6, for example. The failure of different nodes in the SDN will have different impacts on the overall SDN. For example, node 322-1 is a root node to all other nodes in the SDN. If root node 322-1 fails, communication to all other nodes in the SDN fails. Similarly, if controller 330-1 which controls root node 322-1 fails, all of the communications in the SDN fail. If, however, leaf nodes 322-7, 322-8, or 322-9 fail only communication to those nodes will fail. Similarly, if controller 330-2 fails only communication to leaf nodes 322-7, 322-8, or 322-9 will fail.

In one embodiment, the present technology comprises a simple and efficient communication scheme between network controllers and devices. This communication scheme improves on conventional consistency management approaches by taking advantage of the unique topology of networks that have a hierarchical tree structure. One example of such a network is an access network, which may be implemented as an SDN.

Access networks connect users and their client devices, such as desktops, tablets, and smart phones, to a network service provider. More specifically, access networks are made up of a plurality of network-connected devices, which may include controllers, switches, client devices, and other network devices that act as nodes in an access network. In order to minimize costs, access networks are built using the fewest number of network connections, such as network cable lines. This is achieved by arranging network devices and their connections according to a hierarchical tree structure. In such a tree structure, a root node is positioned at the base of the tree. Connections then branch out from the root node in a tree-like manner to connect additional network devices. Devices at the bottom of the tree are positioned at leaf nodes of the tree. In one embodiment, devices that are directly connected to one or more central servers of the access network are positioned at root nodes of the tree. Thus, a root node may be a node that has an upstream connection to another network or server, for example. Although the present technology is described herein with respect to access networks, it is understood that the present technology may also be implemented on other types of networks having a similar hierarchical tree topology.

With respect to the hierarchical structure of access networks, network devices may be described as being upstream or downstream relative to each other. Along a shortest path from a leaf node device to a root node or a central server, devices positioned at higher hierarchical positions in the tree structure of an access network are understood to be upstream relative to devices positioned at lower hierarchical positions. Conversely, along the same said path, devices positioned at lower hierarchical positions are understood to be downstream relative to devices positioned at higher hierarchical positions. In addition, an access network may be subdivided into one or more access distribution trees. An access distribution tree is an independent section of an access network comprising one or more network devices including a network device at a root node of the access network. The network device at the root node may be further connected to additional network devices via connections that branch out from the root node. Network devices from different access distribution trees do not directly connect or communicate with each other.

The network devices of an access distribution tree may be controlled by a single controller, which may have at least one communicative connection to a network device at the root node of the access distribution tree. In one embodiment, the communicative connection may be a physical network cable connecting the controller and the network device, wherein the controller and the network device may be two separate devices. In an alternative embodiment, the controller may be a component within the network device and the communicative connection may be implemented as part of the circuitry within the network device. A controller that is connected to the root node of the access distribution tree may be a primary controller of the access distribution tree. A primary controller is a controller that is connected to the root node of an access distribution tree and has control over all network devices in the access distribution either directly or indirectly via other controllers. In a scenario where an access distribution tree is controlled by a single primary controller, the primary controller does not have to coordinate with other controllers within the same access distribution tree. In addition, the primary controller does not have to coordinate with other controllers of other access distribution trees, because network devices from different access distribution trees in an access network do not interact with each other.

Alternatively, an access distribution may be controlled by additional secondary controllers that may be communicatively connected to one or more network devices at one or more nodes that are downstream to the root node of the access distribution tree. In one embodiment, the primary controller and the one or more secondary controllers are connected to every network devices in the access distribution tree and are each connected to a different, mutually exclusive set of network devices. Secondary controllers coordinate with the primary controller and assist the primary controller in managing the access distribution tree. Secondary controllers are typically used in addition to a primary controller when an access distribution tree is large and comprises many network nodes and devices.

When a primary controller fails, only the access distribution tree associated with that primary controller goes offline. Other access distribution trees controlled by other controllers do not go offline as a result of the primary controller's failure. Similarly, when a secondary controller fails, only the network devices controlled by the secondary controller goes offline. Other network devices controlled by other controllers within the same access distribution tree do not go offline as a result of the secondary controller's failure.

In the event that a primary controller fails, controllers associated with other access distribution trees may be backup controllers that can take over control of the primary controller's access distribution tree. Similarly, when a secondary controller fails, the primary controller of the same access distribution tree may take over control of the network devices previously controlled by the secondary controller. The takeover process may happen quickly to minimize downtime at parts of the access network and maintain high availability of the access network. Consistency across multiple network controllers may be provided to enable a quick takeover process. Controllers can be kept up-to-date on the current status of the network devices and may therefore take over control without further delays.

Conventional approaches to managing consistency in a network include methods of reaching consensus among a cluster of network devices (e.g., Raft). The cluster elects a leader device, which then replicates a log of network operations at every device in the cluster. This approach may cause high latency and slow network response times. Controllers reach consensus before making any changes to devices in the network. Reaching agreement among controllers takes at least one round-trip time (RTT). In addition, this approach may result in low availability. A cluster of devices not have enough devices to meet quorum requirements for reaching agreement among controllers. When quorum requirements are not met, controllers cannot reach agreement, and therefore cannot perform network operations.

SCL may also suffer from latency issues. When controllers cannot reach agreement on the current status of network devices, a controller using the SCL approach directly polls the network devices to get information on their status. However, polling can nevertheless be a costly process in both time and network resources.

Figure 7:
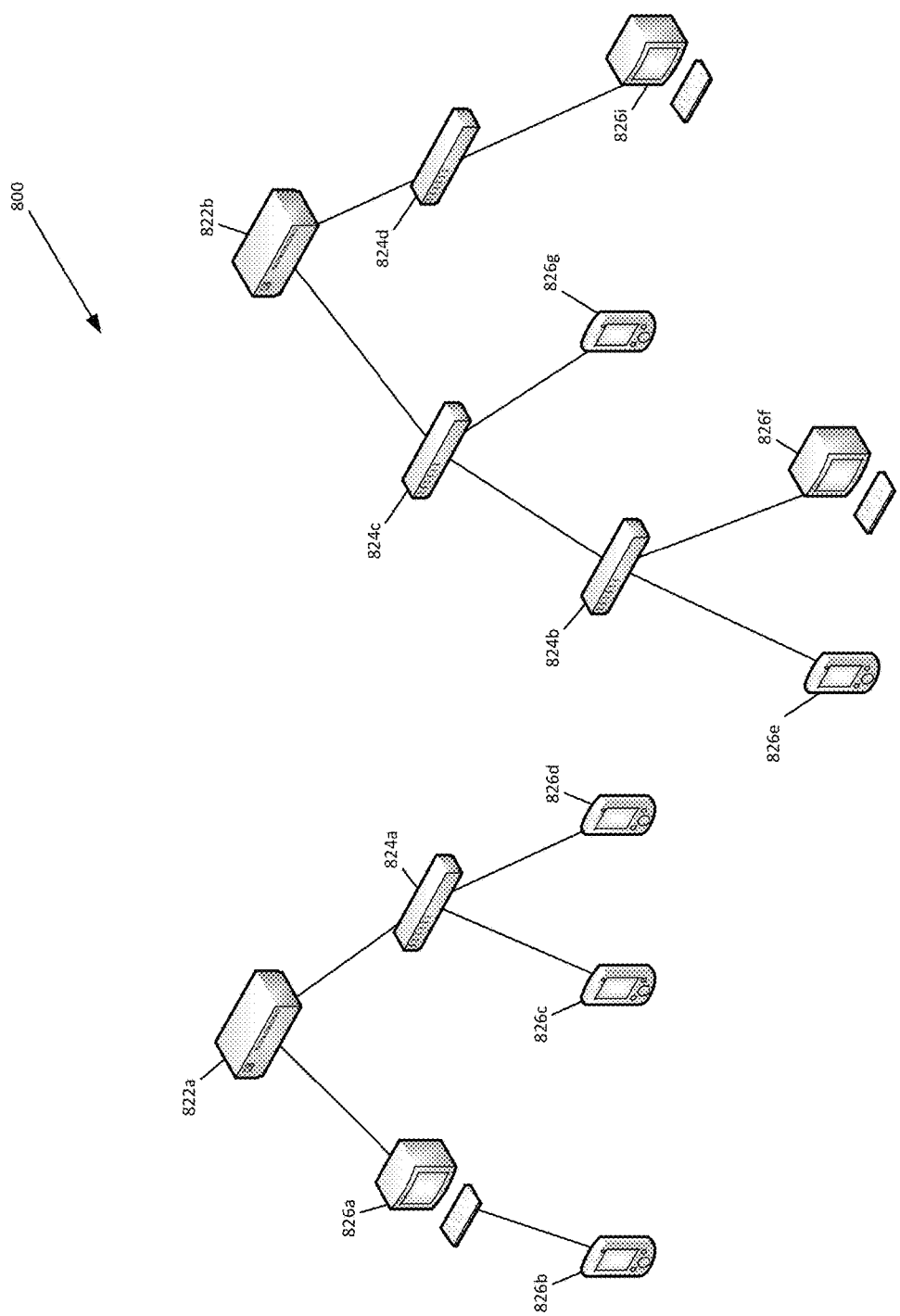
FIG. 7 is a block diagram of an exemplary access network showing network devices positioned at nodes.

FIG. 6 illustrates an exemplary access network 700 according to embodiments of the present technology, highlighting the hierarchical levels of the access network 700. An access network 700 is an example of a distributed system and may also be implemented as a software defined network (SDN). The access network 700 comprises a plurality of network devices 720 at a plurality of network nodes labelled 1$a$ to 3$g$. These network devices 720 may comprise controllers, switches, user client devices, and other network devices 720 that may act as nodes in the access network 700. Although fourteen network devices 720 or nodes are depicted in FIG. 6, it is understood that an access network 700 may comprise any number of network devices 720 at any number of network nodes in alternative embodiments. While FIG. 7 depicts each node has having one network device 720, it is understood that there may be multiple network devices 720 at a single network node in alternative embodiments.

The access network 700 may further comprise one or more controllers, not explicitly shown in FIG. 6, that control and configure network devices at nodes in the access network 700. A controller may be a software or hardware component of a central server or a network device 720, or a standalone and independent network device 720 at a node in the access network 700. A controller controls and configures network devices 720 in order to direct data transfers from an origin device to a target destination at a node in the access network 700. The controller does this by receiving information from network devices 720 and sending out instructions based on the information it receives. A controller may perform one or more network operations, such as making data pathing decisions, configuring network devices, allocating network bandwidth, and sending notifications. According to one embodiment, network devices 720 may communicate with each other using TCP connections. It is understood that other types of communicative connections may be used in alternative embodiments.

As shown in FIG. 6, an access network 100 is arranged as a hierarchical tree structure. Network devices 720 may branch out via connections extending from root nodes 1$a$ and 1$b$ in a tree-like fashion. In this way, network devices 720 may occupy positions at different levels of the hierarchical tree structure, with network devices 1$a$ and 1$b$ occupying level 1, devices 2$a$ to 2$e$ at level 2, and devices 3$a$ to 3$g$ at level 3 of the tree. Network devices 720 that are directly connected to the service provider such as to a central server, include root nodes 1$a$ and 1$b$. Network devices 720 that are only directly connected to devices 720 at a higher level, but not connected to any devices 720 at a lower level occupy leaf nodes in the access network 700. In one example, root nodes 1$a$ and 1$b$ may connect to a service provider, such as to one or more central servers of a service provider.

Connections between network devices 720 are only made between two network devices 720 at different hierarchical positions in the tree structure of the access network 700 in one example. Two network devices 720 at the same hierarchical level may not be connected to each other. For example, nodes 2$a$ and 2$b$ may not be connected to each other. In addition, a network device 720 may be connected to one or more network devices 720 occupying a position at a lower hierarchical level, but may only be connected to one network device 720 occupying a higher level position or to a central server. For example, node 2$a$ may be connected to nodes 3$a$ and 3$b$, but may not be connected to both nodes 1$a$ and 1$b$.

Along any shortest path from a leaf node, such as node 3$a$, to the root node 1$a$ or central server, a network device 720 occupying a higher level position is upstream relative to a network device 720 occupying a lower level position. Similarly, along the same type of path, a network device 720 occupying a lower level position is downstream relative to a network device 720 occupying a higher level position. For example, both nodes 2*a* and 3*a* are downstream to node 1*a*, but node 3*d* is not downstream to node 1*a* since node 1*a* does not fall along the shortest path from node 3*d* to node 1*a*. Given the tree structure of the access network 700, it is understood that upstream nodes occupy more central positions and are in the path of a great proportion of the data flowing from network devices 720 to the service provider.

An access network 700 may be further divided into one or more access distribution trees. An access distribution tree is an independent section of an access network 700 comprising one or more network devices at a root node and one or more network devices 720 connected and downstream to the root node controller. An access distribution tree may be controlled by a single primary controller or multiple controllers including a primary controller and one or more secondary controllers that coordinate with each other to control and configure network devices 720 within the same access distribution tree.

FIG. 7 illustrates another exemplary access network 800 having a plurality of network devices. These network devices comprise routers 822, switches 824, and client devices 826, such as smartphones and desktops. Specifically, the access network 800 comprises two routers 822*a*, 822*b*, four network switches 824*a*, 824*b*, 824*c*, 824*d*, and eight client devices 826*a*-826*i*. The access network 800 further comprises two simple access distribution trees. The first tree comprises router 822*a* and all network devices downstream to the router 822*a*. The second tree comprises router 822*b* and all network devices downstream to router 822*b*.

In one embodiment, each access distribution tree may be assigned one or more controllers that control and configure the network devices in that access distribution tree. By arranging an access network 800 in this way, the first and second access distribution trees may act independently. This is because network devices in an access network 800 connect to a central server to connect with a service provider and do not directly communicate laterally with network devices in other access distribution trees. Consequently, the controllers of the first access distribution tree also do not need to coordinate with the controllers of the second access distribution in order to perform network operations and vice versa. Therefore, controllers of the two trees can perform typical network operations in an access network 800 without having to reach agreement on the status of all network devices. However, it may be desirable to maintain some level of consistency so that a backup controller can immediately take over control in the event of failure at a primary controller. Multiple controllers may be assigned to a single access distribution tree and may need to coordinate with each other to perform network operations within the same access distribution tree. For example, if switch 824*c* goes offline, a secondary controller assigned to switch 824*c* may need to notify a primary controller about switch 824*c*'s status so that the primary controller could divert traffic away from switch 824*c* and towards device 826*h*.

Figure 8:
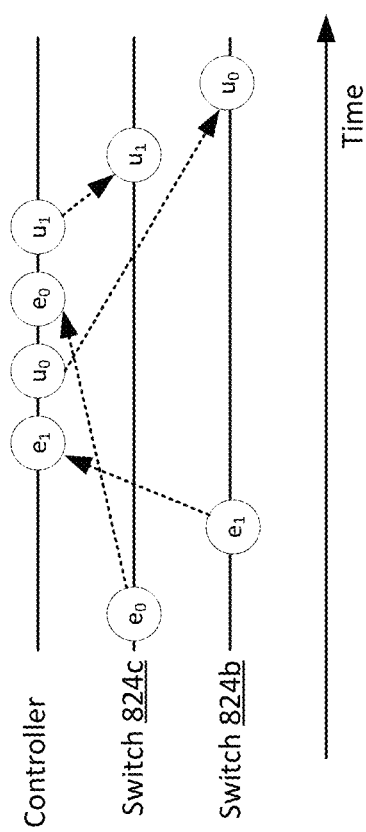
FIG. 8 is an exemplary event timeline.

FIG. 8 is a timeline showing a sequence of event notifications from network devices to a controller. With reference to FIG. 8, switches 824*c* and 824*b* may send event notifications e0 and e1 to the controller. The controller may receive the event notifications from the two switches 824*a* and 824*b* and in response send either update u0 or u1 based on analyzing the information the controller receives. According to one embodiment, e0 may indicate that switch 824*b* is offline, while e1 may indicate that switch 824*b* is online. In response to e0, a controller may respond with update u1, which diverts network traffic away from switch 824*b*. For example, the controller may send an instruction to switch 824*c* to limit its network bandwidth usage or set it to zero. In response to e1, the controller may respond with update u0, which diverts network traffic towards switch 824*b*. For example, the controller may send an instruction to switch 824*b* to set its network bandwidth usage to a certain predetermined amount.

According to one embodiment of the disclosed technology, network devices communicate with each other and with controllers using TCP protocols. TCP protocols are timing agnostic in that they do not guarantee that the order and timing of event notifications reflect the actual order and timing of events as they happen in the access network. Thus, multiple controllers working together may need to agree on the same event order in order to prevent conflicts when executing network operations.

As shown in FIG. 8, although a first event notification e0 may have been sent before a second event notification e1, e0 may nevertheless be received by the controller at a later time than e1. As a result, the controller may believe that e0 reflects on the most current status update and that switch 824*b* is offline, even though switch 824*b* has later come online as indicated by event e1. Based on this understanding of the status of switch 824*b*, controller ultimately sends out instructions u1 to divert traffic away from switch 824*b* even though switch 824*b* is now online. According to one embodiment, a technique is provided for handling event notifications in a manner for a controller to have more up-to-date information on the status of network devices.

In one embodiment, network devices across different access distribution trees in an access network do not communicate with each other directly. As such, routing of data across different access distribution trees may not be necessary. Controllers across different access distribution trees may not need to reach consensus before making pathing decisions and configuring network devices within their own access distribution tree. According to one embodiment, controllers directly control and configure devices within the access distribution tree the controller was assigned to prior to sending notifications to update the controllers of other access distribution trees regarding any changes to the status of devices in the access network.

Figure 9:
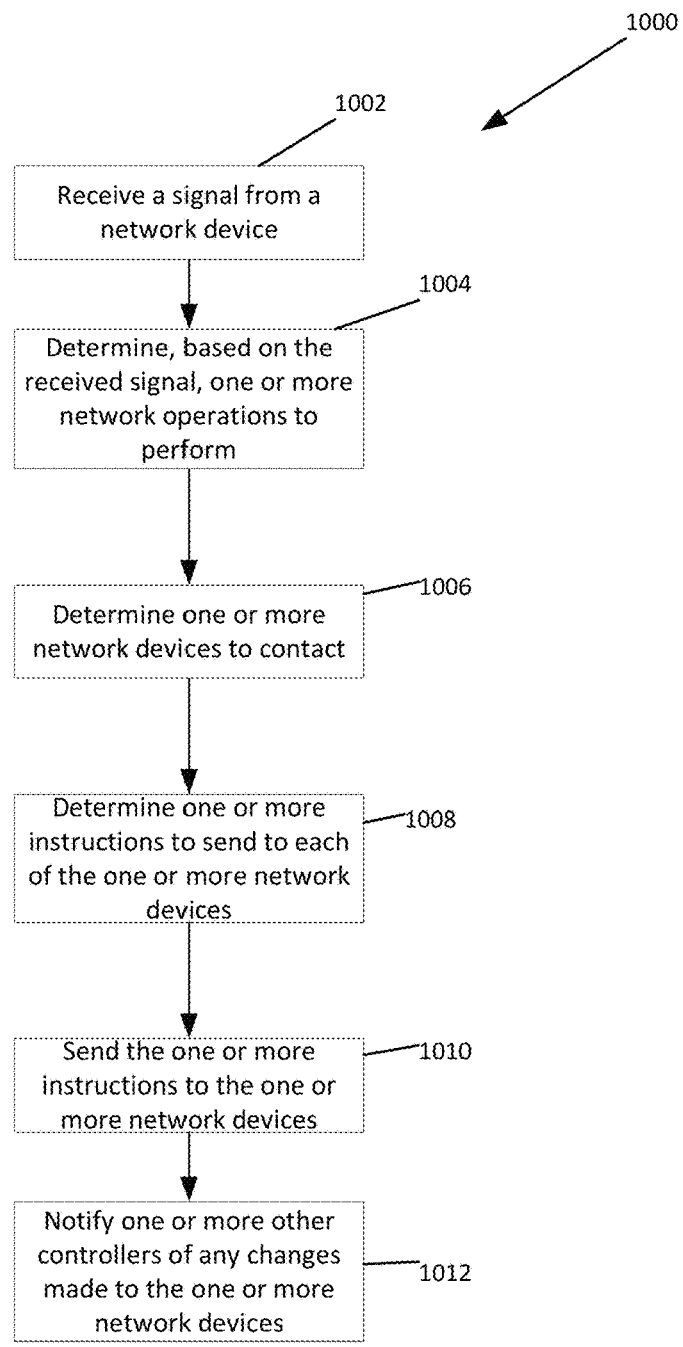
FIG. 9 is a flowchart describing a process including network operations that a controller may perform in one embodiment.

FIG. 9 is a flowchart describing a process 1000 of managing network nodes according to one embodiment. In one embodiment, process 1000 is performed by a controller as part of a sequence of network operations to provide notification updates after configuring devices in response to an event.

At step 1002, a controller within the access network receives a signal from a network device, such as another controller, a switch, a client device, or any other network device. According to one embodiment, the signal may contain information on the status of one or more network devices, such as whether the devices are online or offline, their current processing speeds, or their current network traffic and bandwidth. The signal may alternately or additionally comprise information about network events, such as when a device goes offline or online, the initiation and the completion of data transfers, user requests, or any other events happening at devices in the access network. In one embodiment, the signal may be a request to the controller to set up a data routing path for transferring data from an originating device to a target destination. It is understood that the signal could contain any other information about the status and operations of the access network in various embodiments.

At step 1004, the controller analyzes the signal received at step 1002 and determines one or more network operations to perform. As previously discussed, network operations may include making data pathing decisions, executing data transfers, controlling and configuring network devices, sending notifications to other controller, or any other network operation that may be performed. With reference to FIG. 7, for example, controller may determine to perform first and second network operations in response to a signal about switch 824a going offline. The first network operation may include reallocating network bandwidth and the second network operation may include notifying other controllers about the status of switch 824a and the changes controller makes to network bandwidth.

At step 1006, based on signal received at step 1002 and the network operations chosen at step 1004, the controller determines one or more network devices to contact. In one embodiment, the controller may determine that it needs to configure a switch so that more network bandwidth may be allocated to the switch. In addition, the controller may determine that it needs to send a notification to another controller for a different access distribution tree.

At step 1008, the controller may determine one or more instructions to send to the one or more network devices determined at step 1006 based on the network operations chosen at step 1004. With reference to FIG. 7, for example, the controller may determine that it should send two instructions based on a signal notifying the controller that switch 824c is offline. A first instruction is sent to switch 824c to decrease the network bandwidth assigned to switch 824c. A second instruction is sent to switch 824d increasing its bandwidth allocation. At step 1010, these instructions are performed by the controller and by the devices determined at step 1006.

At step 1012, the controller sends a notification to other controllers of any operations performed and any changes in the status of network devices. In one embodiment, the primary controller notifies a backup controller that switch 824c is now offline and that network bandwidth has been re-allocated from switch 824c to switch 824d. In one embodiment, a timestamp is sent as part of the notification to indicate when the network events and the changes described in the notification took place. Using the timestamp, controllers may maintain a log of network events in chronological order.

By sending instructions to control and configure network devices prior to notifying other controllers, the controller is able to more quickly perform network operations and respond to network events. Compared to conventional methods, this avoids any delays in performing network operations resulting from having to seek consensus or maintain network consistency with other controllers. Through the use of notifications, however, consistency across controllers in different access distribution trees is nevertheless maintained, thus allowing backup controllers to immediately take over the work of a primary controller in the event of a controller failure at a primary controller. The use of a time stamp in the notifications sent by a primary controller to other controllers in the access network allows controllers to maintain a log of network events and their chronological sequence.

Figure 10:
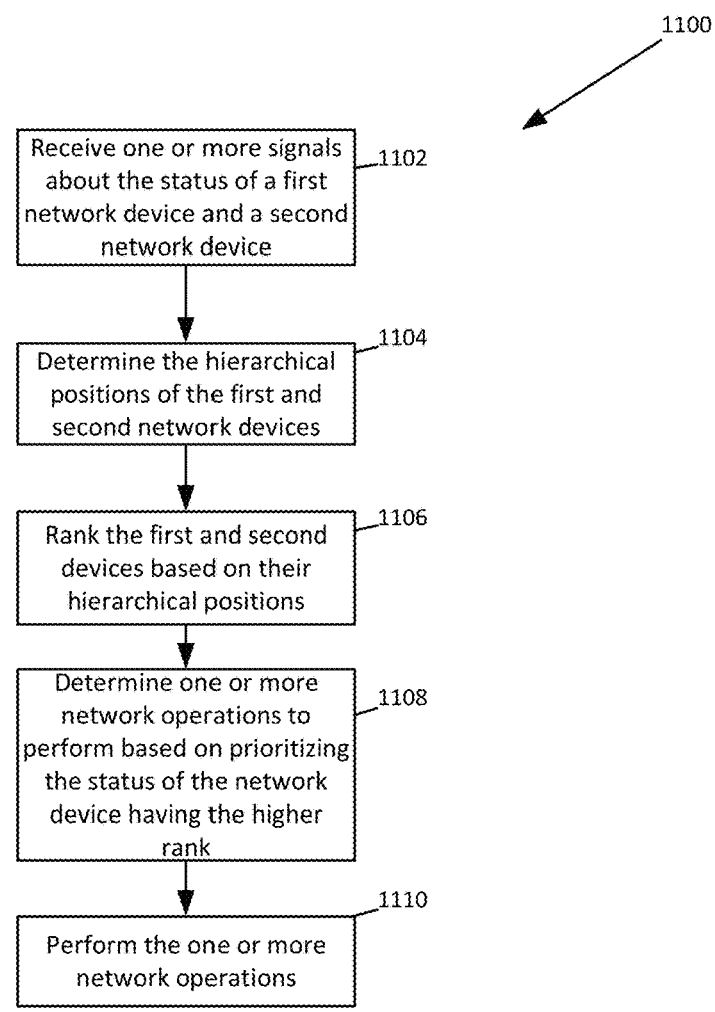
FIG. 10 is flowchart describing a process of managing network nodes in one embodiment.

In one embodiment, data from downstream devices passes through upstream devices to reach a root node. As such, the status of more upstream devices may be prioritized when making data pathing decision. Because data will pass through the more upstream node, its status can be prioritized over that of downstream nodes FIG. 10 is a flowchart describing a process 1100 of managing network nodes in one embodiment. In one embodiment, process 1100 is performed by a controller as part of configuring network nodes based on the status (e.g., online or offline) of upstream and/or downstream devices.

At step 1102, a controller receives one or more signals identifying the status of a first and a second network device. For example, with reference to FIG. 7, the controller may receive a signal from switch 824c in the form of a status update indicating that switch 824c is offline and a second signal from switch 824b that the status of switch 824b is online.

At step 1104, the controller determines the hierarchical positions of the first and second network devices. For example, the controller may determine that switch 824b is positioned at level 3 while switch 824c is positioned at level 2.

At step 1106, the controller ranks the first and second devices based on their hierarchical positions. For example, the controller may assign rank 1 to switch 824c and rank 2 to switch 824b.

At step 1108, the controller determines one or more network operations to perform on one or more network devices based on prioritizing the status of the network device having the higher rank. For example, the controller may decide to assign less bandwidth to switch 824b since switch 824c is offline, even though switch 824b is online, because switch 824c is higher ranked compared to switch 824b.

At step 1110, the controller performs the one or more network operations. As depicted in FIG. 10, the system can prioritize the status of devices that are positioned at higher levels in the access network to ensure that controllers make decisions that are more likely to result in successful data transfers from any given network device to the central server.

Because upstream nodes are more centrally located in an access network, they more frequently play a role in facilitating data transfers through the access network. Therefore, it may be more beneficial to prioritize updates regarding the status of upstream devices. For example, backup controllers can be updated regarding the status of upstream devices so that the backup controllers would more likely be able to successfully takeover a primary controller in the event of a controller failure. In one embodiment, controllers notify other controllers about the status of upstream devices before sending notifications about the status of more downstream devices.

Figure 11:
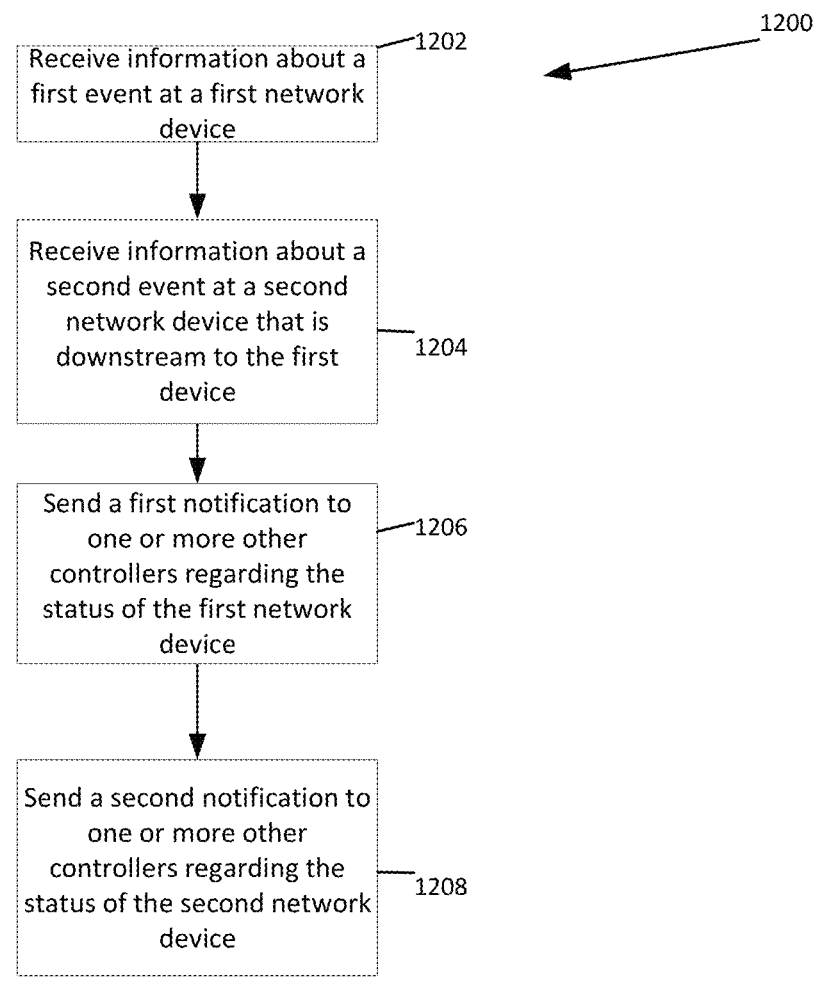
FIG. 11 is a flowchart describing a process of controller notification based on device position according to one embodiment.

FIG. 11 is a flowchart describing a process 1200 of controller notification based on device position according to one embodiment. In one example, process 1200 is performed by a controller to prioritize and issue status notifications to other controllers in the network.

At step 1202, a controller in the access network receives information about a first event at a first network device. In one embodiment, the event may be a change in the status of the first network device, such as switch 824c going offline. At step 1204, the controller receives information about a second network device that is downstream to the first network device. In one embodiment, the second network device is switch 824b and the event is that switch 824b has come online.

At step 1206, the controller sends a first notification to one or more other controllers about the status of the first network device. In one embodiment, a primary controller sends the first notification to a backup controller. Since the first network device, switch 824c, has gone offline, the primary controller notifies the backup controller that switch 824c is offline. The controller chooses to notify about the status of the first network device because the first network device is more upstream along the same data path relative to the second network device.

At step 1208, the controller sends a second notification to one or more controllers about the status of the second network device. In one embodiment, the primary controller sends the second notification to the backup controller. Since the second network device, switch 824b, has come online, the primary controller notifies the backup controller that switch 824b is online.

Figure 12:
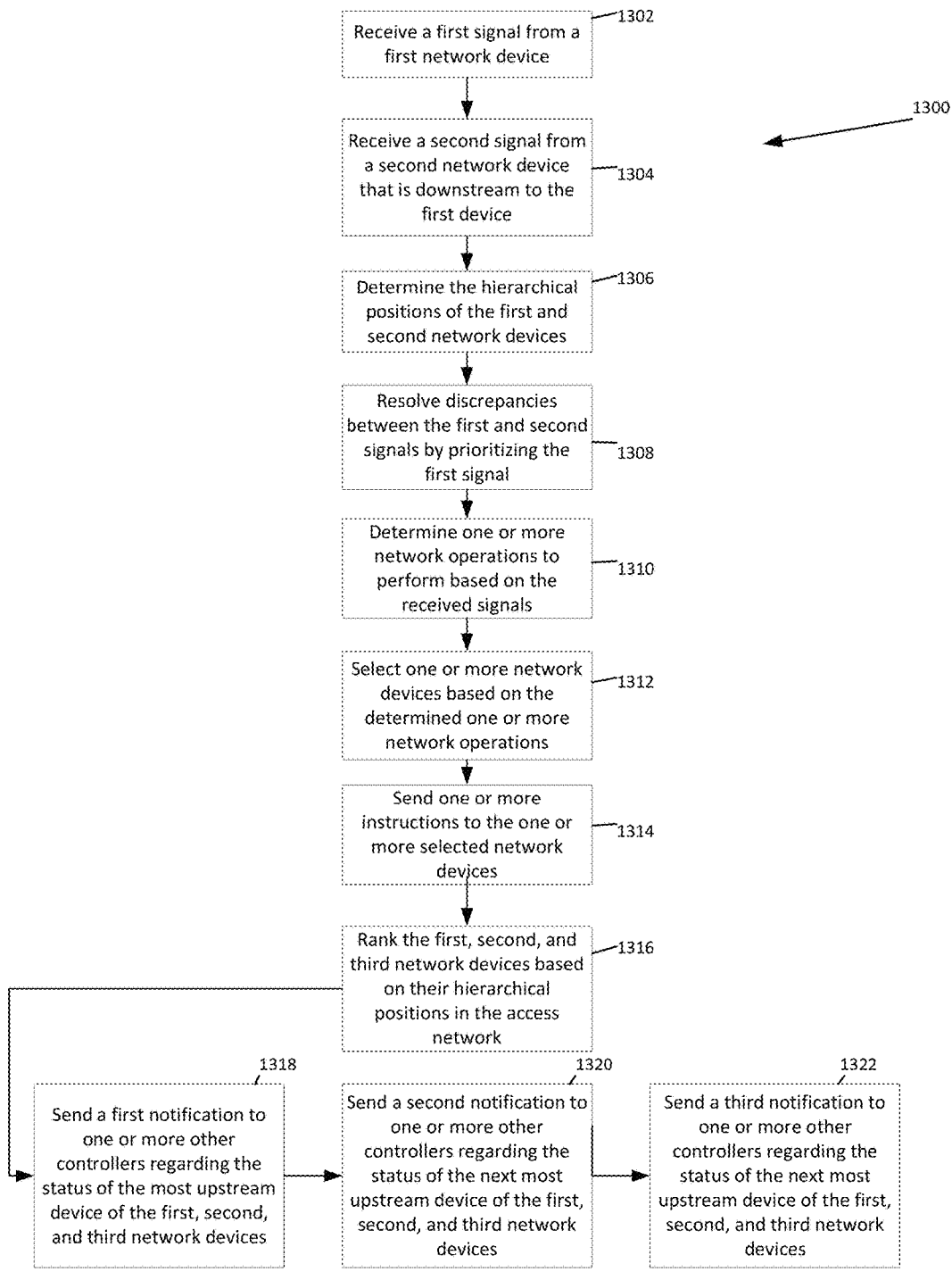
FIG. 12 is a flowchart describing a process of managing network nodes according to one embodiment.

FIG. 12 is a flowchart describing a process 1300 of managing network nodes in an access network according to embodiment. In one example, process 1300 is performed by a controller to manage network nodes and maintain consistency in an access network. At step 1302, a controller of the access network receives a first signal from a first network device. In one embodiment, with reference to FIG. 8, the first network device may be switch 824c and the signal may be status notification from switch 824c that it is offline.

At step 1304, the controller receives a second signal from a second network device that is downstream to the first network device. In one embodiment, the second network device is switch 824b and the signal is a status notification that switch 824b is online (e.g, indicating that switch 824b has a link to switch 824c).

At step 1306, the controller determines the hierarchical positions of the first and second network devices, including relative positions of the first and second network devices. In one embodiment, the controller determines that switch 824c is positioned at level 2 in the hierarchical tree structure of the access network and that switch 824b is positioned at level 3. In addition, the controller determines that switch 824c is upstream relative to switch 824b and one level above switch 824b.

At step 1308, the controller may attempt to identify discrepancies between the status information. The controller may then resolve any identified discrepancies by prioritizing the status of the first device because the controller has identified that the first device is upstream relative to the second device. In one embodiment, the controller identifies that the status information is inconsistent with respect to the status of switch 824c. The controller then resolves this discrepancy by prioritizing the status of switch 824c to determine that switch 824b is also offline or cannot be reached because switch 824c is offline.

At step 1310, the controller determines one or more network operations to perform based on the received signals. Specifically, in one embodiment, the controller determines to redistribute network bandwidth based on the assumption that switch 824c is offline. At step 1312, the controller selects one or more network devices based on the determined one or more network operations. In one embodiment, the controller reallocates bandwidth away from switch 824c and to switch 824d in response to determining that switch 824c is offline.

At step 1314, the controller sends one or more instructions to the one or more selected network devices. In one embodiment, the controller sends switch 824d an instruction that it is to receive an increase in the network bandwidth that the controller has to manage. The controller can send an instruction to switch 824b that it is not allocated any bandwidth because switch 824c is offline.

At step 1316, the controller determines the hierarchical positions of the first and second network devices as well as the one or more selected network devices, as well as their positions relative to each other. In one embodiment, the controller determines that both switch 824c and switch 824d occupy a second level in the hierarchical tree structure of the access network and that switch 824b occupies a third level. In addition, the controller determines that switch 824c is upstream relative to switch 824b.

At step 1318, the controller send a first notification to one or more other controllers on the status of a network device having a highest hierarchical position from among the network devices discussed at step 1316. At step 1320, the controller sends a second notification to one or more other controllers on the status of a network device having a second highest hierarchical position from among the network devices discussed at step 1316. At step 1322, the controller sends a third notification to one or more other controllers on the status of a network device having a third highest hierarchical position from among the network devices discussed at step 1316. In one embodiment, the controller may send to a backup controller a first notification that switch 824c is offline, a second notification that switch 824d has an increased bandwidth allocation, and a third notification that switch 824b has no allocated bandwidth.

For downstream communications in one embodiment, the status of downstream devices is prioritized over the status of upstream devices. For upstream communications, the status of upstream devices is prioritized over the status of downstream devices.

Figure 13:
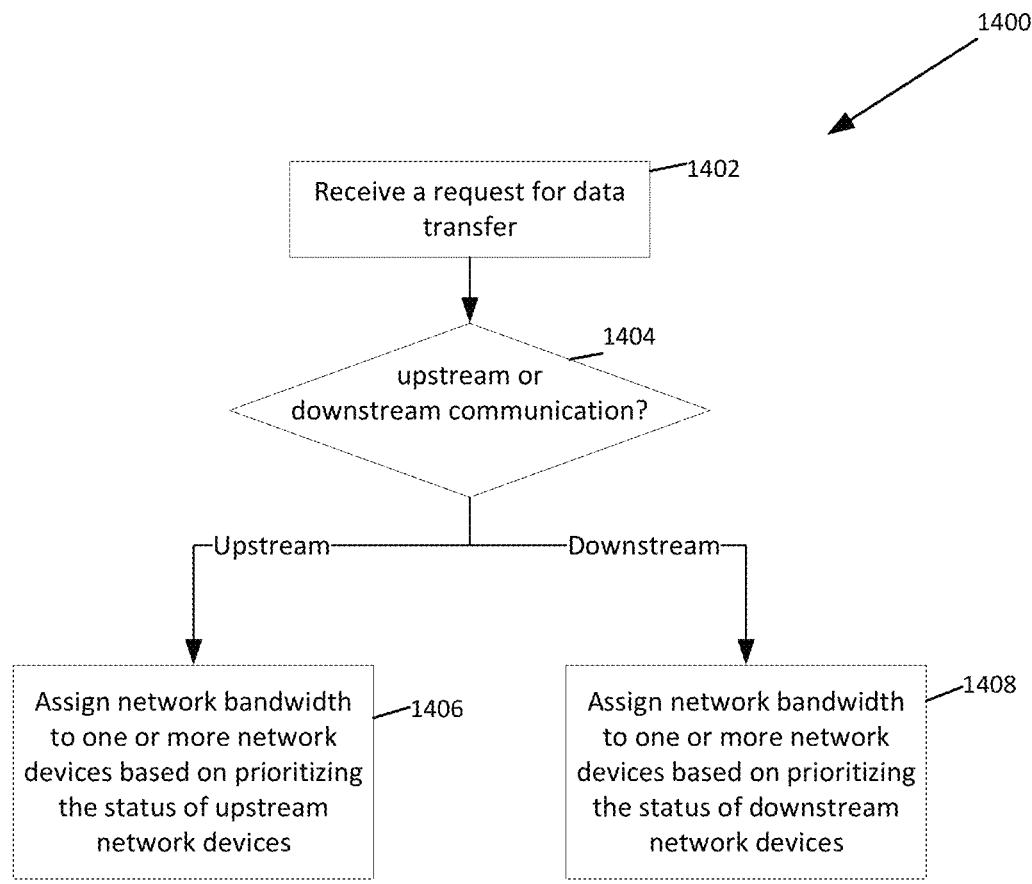
FIG. 13 is a flowchart describing a process of making data pathing decisions based on whether a data flow is in an upstream or downstream direction.

FIG. 13 is a flowchart describing a process of making data pathing decisions based on whether the data flow is in an upstream or downstream direction. In one example, process 1300 is performed by a controller to manage network nodes and maintain consistency in an access network.

At step 1402, the controller receives a data transfer request from an originating network device to a target network device. For example, with reference to FIG. 8, the originating network device may be router 822b and the target network device may be client device 826f.

At step 1404, the controller determines whether the data transfer is in an upstream or downstream direction. In one embodiment, the controller does this based on the hierarchical position of the originating and target network devices. For example, the controller may determine that router 822b is positioned at level 1 while client device 826f is positioned at level 4. Given that the direction of data transfer is from level 1 to level 4, the controller determines that the direction of the data transfer is in a downstream direction. If the controller determines that the direction of data transfer is upstream, then the process proceeds to step 1406. Otherwise, if the controller determines that the direction is downstream, the process proceeds to step 1408.

At step 1406, the controller assigns network bandwidth to one or more network devices based on prioritizing the status of upstream network devices. In one embodiment, the controller does this by determining one or more network devices that the data needs to pass through to reach the target network device and the status of the one or more network devices as well as the status of the target device. For example, in response to a request to transfer data from client device 826f to router 822b, the controller determines that the data would need to pass through switch 824b and 824c before reach router 822b. The controller may then determine that switch 824b is online, switch 824c is online, and router 822b is offline. In this case, because router 822b is more upstream than switches 824b and 824c, the controller prioritizes the status of the router over the status of the two switches in its decision to allocate network bandwidth. As a result, the controller may assign less network bandwidth to router 822*b* since it is offline, even though both switches 824*b* and 824*c* are online.

At step 1408, the controller assigns network bandwidth to one or more network devices based on prioritizing the status of downstream network devices. In one embodiment, the controller does this by determining one or more network devices that the data needs to pass through to reach the target network device and the status of the one or more network devices as well as the status of the target device. For example, in response to a request to transfer data from router 822*b* to client devices 826*f*, the controller may determine that the data would need to pass through switches 824*c* and 824*b* before reaching client device 826*f*. The controller may also determine that switches 824*b* and 824*c* are online while client device 826*f* is offline. In this case, because client device 826*f* is more downstream than switches 824*b* and 824*c*, the controller prioritizes the status of the client device over the status of the two switches in its decision to allocate network bandwidth. As a result, the controller may assign less network bandwidth to router 822*b* since client device 826*f* is offline, even though both switches 824*b* and 824*c* are online.

Figure 14:
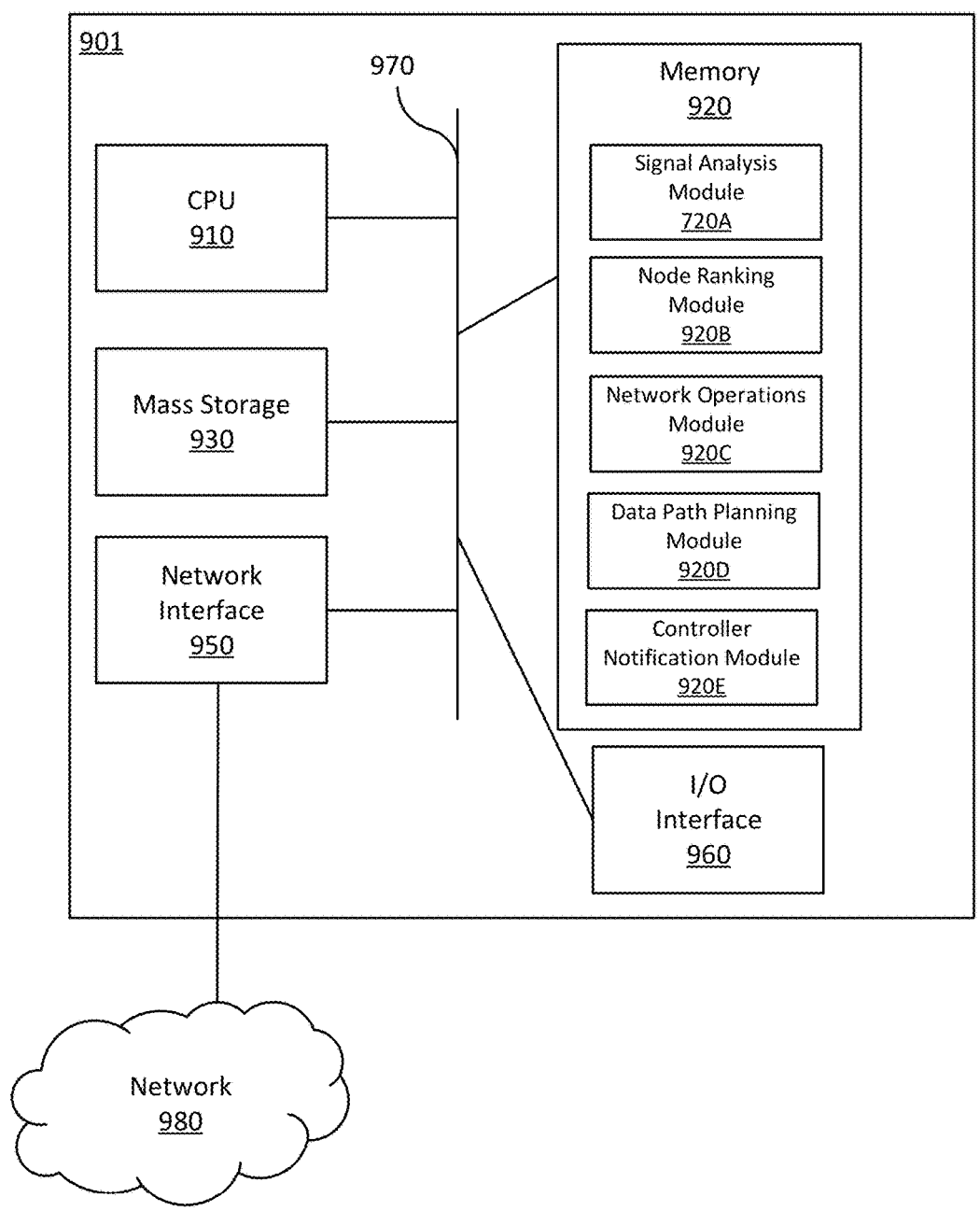
FIG. 14 is a high level block diagram of a computing system.

FIG. 14 is a block diagram of a network device 900 that can be used to implement various embodiments. Specific network devices may utilize all of the components shown, or only a subset of the components, and levels of integration may vary from device to device. Furthermore, the network device 900 may contain multiple instances of a component, such as multiple processing units, processors, memories, transmitters, receivers, etc. The network device 900 may comprise a processing unit 901 equipped with one or more input/output devices, such as network interfaces, storage interfaces, and the like. The processing unit 901 may include a central processing unit (CPU) 910, a memory 920, a mass storage device 930, and an I/O interface 960 connected to a bus 970. The bus 970 may be one or more of any type of several bus architectures including a memory bus or memory controller, a peripheral bus or the like.

The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs. In embodiments, the memory 920 is non-transitory. In one embodiment, the memory 920 includes a signal analysis module 920A that analyzes received signals for information on the status of network devices, network events, and user and machine-initiated requests, a node ranking module 920B that determines the hierarchical positions of network devices from which signals are received and ranks them according to the hierarchical relationships network devices have with each other, a network operations module 920C that determines what types of network operations to perform and which network devices to perform those operations upon based on the information received from network devices, a data path planning module 920D that determines a path in the form of a sequence of network devices for data to travel from a originating device to a target destination, and a controller notification module 920E that generates and sends notifications to other controllers regarding the status of network devices and any operations performed on them.

The mass storage device 930 may comprise any type of storage device configured to store data, programs, and other information and to make the data, programs, and other information accessible via the bus 970. The mass storage device 930 may comprise, for example, one or more of a solid state drive, hard disk drive, a magnetic disk drive, an optical disk drive, or the like.

The processing unit 901 also includes one or more network interfaces 950, which may comprise wired links, such as an Ethernet cable or the like, and/or wireless links to access nodes or one or more networks 980. The network interface 950 allows the processing unit 901 to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated, For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A device, comprising:
a non-transitory memory storage comprising instructions; and
one or more processors in communication with the memory, wherein the one or more processors execute the instructions to:
receive, at a first controller that is coupled to a first server at a first root node of a software-defined access network having two or more network-connected devices arranged in a hierarchical tree structure, a signal from a second controller that is coupled to a second server at a second root node of the software-defined access network, the signal relating to a status update of one of first and second network-connected devices based on which of the first and second network-connected devices is higher in the hierarchical tree structure;
determine, based on the received signal, one or more instructions to be transmitted to one or more controlled devices positioned in a downstream node relative to the root node;
transmit the one or more instructions to the one or more controlled devices; and
notify one or more other controllers in the access network of one or more changes to the one or more controlled devices after transmitting the one or more instructions.

2. The device of claim 1, wherein:
determining the one or more instructions includes identifying the one or more controlled devices in response to the signal and determining configuration information for the one or more controlled devices; and
transmitting the one or more instructions includes transmitting the configuration information to the one or more controlled devices.

3. The device of claim 2, wherein the one or more processors execute the instructions to:
configure the one or more controlled devices based on the configuration information.

4. The device of claim 3, wherein the one or more processors execute the instructions to:
configure the one or more controlled devices without achieving agreement with the one or more other controllers.

5. The device of claim 1, wherein each of the two or more network-connected devices includes at least one of a controller, a switch, or a user device.

6. The device of claim 1, wherein the signal comprises a data routing request.

7. The device of claim 1, wherein the one or more instructions comprise instructions for routing data through the access network.

8. The device of claim 1, wherein the one or more changes in the one or more controlled devices comprise one or more updates to a log of all events occurring at each of the one or more controlled devices.

* * * * *